Aug. 22, 1961  S. A. MACKENZIE ET AL  2,996,920
INTEGRATOR BRAKE
Filed June 30, 1960
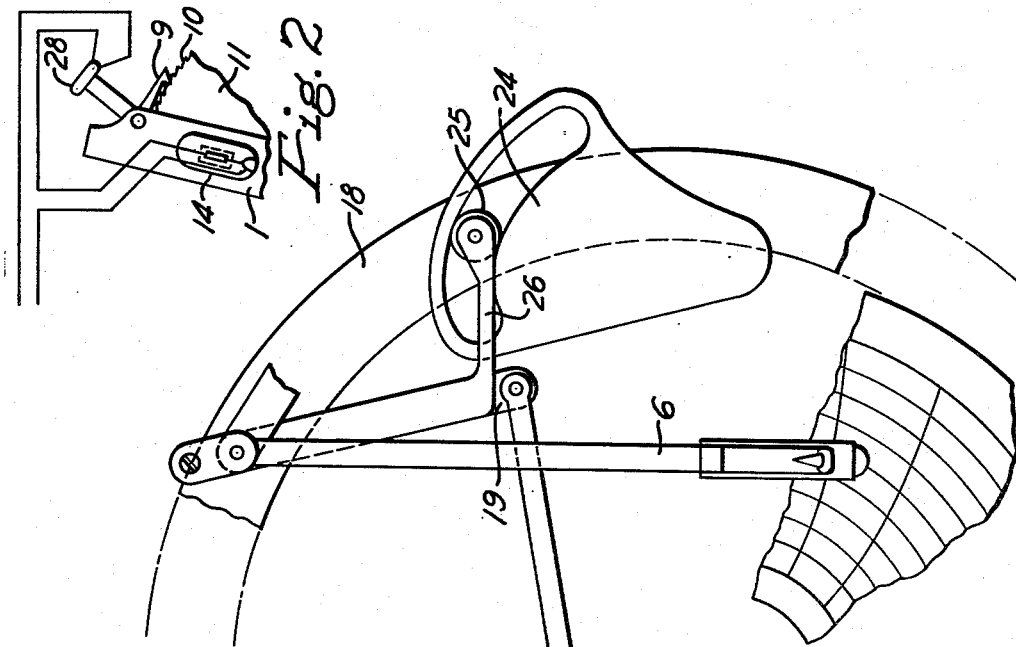
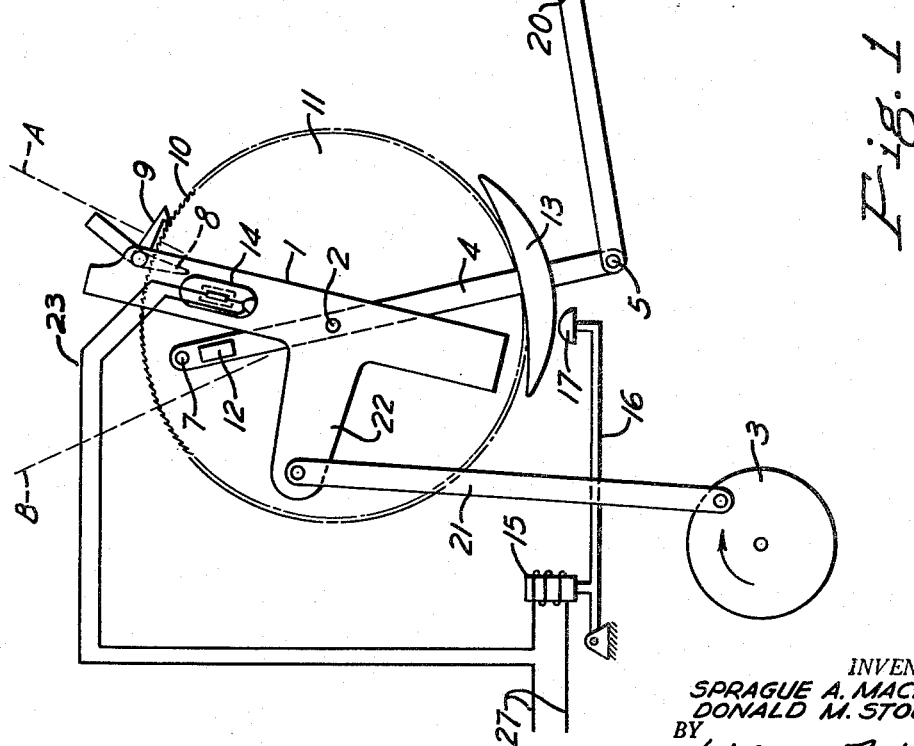
INVENTORS
SPRAGUE A. MACKENZIE
DONALD M. STOUGH
BY
William L. Krayer
ATTORNEY United States Patent Office 2,996,920
Patented Aug. 22, 1961

2,996,920
INTEGRATOR BRAKE
Sprague A. Mackenzie, Orrville, Ohio, and Donald M. Stough, Penn Hills Township, Allegheny County, Pa., assignors to Hagan Chemicals & Controls, Inc., Pittsburgh, Pa.
Filed June 30, 1960, Ser. No. 40,086
7 Claims. (Cl. 74—1)

This invention relates to meters. More particularly, it relates to means for stabilizing an integrator pen arm.

Intergrators for ring balance meters and other meters employing time charts have long been known. Such an integrator, to which the present invention is fully applicable, is described by Zucrow in U.S. Patent 2,376,108, the entire specification of which is adopted herein as part of our disclosure. The purpose of an integrator is to provide at all times a numerical value which may be compared to a known time. For example, where a meter measures the rate of flow, the integrator provides a comparison of the meter measurement with time such that the result is the total number of gallons, cubic feet or other units which have passed through the metered conduit in a known period of time.

Integrators of the type disclosed by Zucrow, U.S. Patent 2,376,108, has been quite successful. However, a disadvantage which has detracted from its advantages and lowered the accuracy of the meter is the tendency of the pen arm of the meter to be slightly deflected when the pawl foot strikes the trip pin of the index lever. The periodic striking of the trip pin by the pawl foot has often thus resulted in an apparently broad line on the chart rather than the desired narrow one.

FIGURE 1 is a more or less diagrammatic side elevational view of my invention applied to a standard meter integrator. FIG. 2 is a more or less diagrammatic side elevational view of the upper end of the time cycle lever of the same type of device equipped with a variation of my invention to eliminate interference on the return trip of the time cycle lever.

Reference is made to the more or less diagrammatic side elevational view of an integrator incorporating a preferred form of our invention shown in FIGURE 1.

In FIG. 1, time cycle lever 1, mounted on shaft 2, is oscillated through linkages 21 and 22 by a synchronous motor 3 or other mechanism. The sweep of time cycle lever 1 as illustrated is about 45° from point A to point B. Its motion is continuous and periodic.

Index lever 4 is also mounted on shaft 2. It is positioned relative to the position of the meter reading, and indeed is connected directly to the meter proper through movable pivot 5 and linkages 19 and 20. The position of the index lever 4 relative to point A is proportional to the valve being metered as, for example, a rate of flow. Index lever 4 is equipped with a trip pin 7 which is located on the path of the foot 8 of pawl 9. Pawl 9 engages teeth 10 of wheel 11, also mounted on shaft 2. Index lever 4 is equipped with a permanent magnet 12 and a brake cam 13. Time cycle lever 1 is equipped with a magnetically actuated switch 14. Preferably it is placed on the outer side of the time cycle lever; where this is done, it should cover a hole in the time cycle lever. Magnetically activated switch 14 is connected by appropriate electrical wiring 23 to solenoid 15 and power source 27. Solenoid and plunger 15 are constructed to raise brake arm 16 when energized, thus establishing contact between brake cam surface 13 and brake pad 17. Preferably brake pad 17 is constructed of a resilient material such as rubber.

Operation of the integrator is as follows: As in the conventional apparatus, the rotation of ring balance 18 or other meter component having a position relative to a variable, through linkages 19 and 20 provides movement to index lever 4 relative to the measured variable such that at zero flow, the index lever 4 is at point A and at maximum flow, it is at point B. A steady flow will, of course, hold the index lever stationary. Where flow measurements are made such that flow is proportional to the square root of a differential, a cam surface 24 can be provided for roller 25 attached through L-arm 26 to linkages 19 and 20 to provide square root extraction so that the position of index lever 4 is directly proportional to flow. Other variables may require different linearization means. A synchronous motor 3, through linkage 21 and arm 22 of time cycle lever 1, causes time cycle lever 1 to oscillate between points A and B periodically. Pawl 9, when passing to the left, normally engages teeth 10 of wheel 11, turning the wheel with it. When pawl foot 8, however, strikes trip pin 7 located on index lever 4, it is tripped and the wheel is released. The pawl is then disengaged throughout the rest of the time cycle as is explained in Zucrow, U.S. Patent 2,376,108. The turning of wheel 11 drives a counter assembly which counts the revolutions of the wheel or displays a number proportional to the number of revolutions of the wheel in a given time. Thus, the mechanism can provide a reading directly in gallons or other suitable units.

A notable disadvantage of the conventional mechanism is the tendency of the pen arm 6 to be jolted when pawl foot 8 strikes trip pin 7. The frequent periodic tripping of the pawl results in a high-frequency, low-amplitude, zigzag on the chart which appears to be a broad line. The broad line provides a much less accurate reading than is desirable.

Our invention eliminates this problem entirely. It provides reliable braking action for the index lever at the precise moment that the pawl foot strikes the trip pin. When switch 14 passes magnet 12, the switch is closed, energizing solenoid 15. Solenoid 15, through arm 16, applies brake pad 17 to brake cam 13, thus holding in place the index lever and the attached linkages to the pen arm. In this manner a fine line is produced on the chart while performance of the integrator is not in the least impaired.

Our integrator can be used on any type of meter which can position the index lever relative to the measured variable. Of course, it is not limited to the integration of flow but may integrate any variable measured by an applicable meter. Obviously, the magnet may as well be positioned on the time cycle lever and the switch on the index lever.

Magnetically operable switch 14 is preferably of the type having a pool of mercury in a vial. One lead is permanently in contact with the mercury. The second lead comprises a spring actuated wire having affixed thereon a small piece of steel or other magnetically attractive material in such a position that when a magnetic force is applied from a particular direction, the second lead is moved to make contact with the mercury pool.

A mercury level switch may be provided on the pawl to open the circuit when the time cycle lever is passing over the index lever from left to right; thus, even though the magnetically operated switch is closed, no current will flow, and the brake will not be operated needlessly on the time cycle lever's return journey to point A. FIGURE 2 illustrates such a variation.

In FIGURE 2, mercury level switch 28 is shown wired in series with previously described switch 14. In the position shown, switch 28 is in the closed position, as pawl 9 is engaged with teeth 10 of wheel 11. On the pawl's return trip from B to A, when the pawl 9 is not engaged, the angle of level switch 28 is such that the switch is open. The level switch 28 thus prevents the needless operation of solenoid 15 when switch 14 passes over magnet 12 on the time cycle lever's trip from point B to point A.

While we have shown and described certain present preferred embodiments of our invention, it is to be distinctly understood that the invention is not limited thereto but may be otherwise variously embodied within the scope of the following claims.

We claim:

1. In an integrator having a time cycle lever, an index lever, and a wheel turned by the operation of said time cycle lever and said index lever, means for stabilizing said index lever while it is striking said time cycle lever comprising a magnet mounted on one of said levers, a magnetically operated switch mounted on the other lever, said magnet and said switch being in parallel arcs, a solenoid connected electrically to said magnetically operated switch, a brake pad operably connected to said solenoid, and a brake cam on said index lever whereby when said solenoid is energized, said brake pad contacts said brake cam.

2. An integrator comprising a shaft, a peripherally toothed wheel mounted thereon, a time cycle lever mounted on said shaft and having a footed pawl engageable with the teeth of said wheel and a magnetically operated switch thereon, means for oscillating said time cycle lever, an index lever mounted on said shaft and having a trip pin the same distance from said shaft as the pawl foot and a brake cam thereon, means for connecting said index lever to a meter, a permanent magnet mounted on said index lever, a solenoid electrically energizable by said magnetically operated switch, and means activated by said solenoid for applying pressure to said brake cam.

3. In an integrator comprising an index lever, means for positioning said index lever relative to a variable, a time cycle lever, means for oscillating said time cycle lever, means for periodically integrating the position of said index lever relative to a zero position comprising a toothed wheel, the pawl pivotally attached to said time cycle lever and engageable with said toothed wheel, a toggle on said pawl, and a trip pin on said time cycle lever in the path of said toggle, means for stabilizing said index lever when said trip pin strikes said toggle comprising a magnetically operable switch mounted on said time cycle lever, a permanent magnet oppositely disposed on said index lever, and means connected to said switch for clamping said index lever.

4. A pen arm stabilizer for a meter integrator comprising a magnetically operable switch, means for oscillating said magnetically operable switch, a magnet, means for positioning said magnet relative to a variable to be integrated and in proximity to the path of said magnetically operable switch, a solenoid and plunger, means for electrically connecting said magnetically actuable switch to said solenoid, a brake pad operably connected to said plunger, and a cam surface connected to a pen arm and engageable with said brake pad.

5. In a device having two elements relatively movable in parallel planes and in which at least one of said elements is subject to instability of position when said elements are in opposite proximity, means for stabilizing one of said elements when the two said elements are in opposite proximity comprising a magnet on one such element, a magnetically operable switch on the other such element, a solenoid energizable by said magnetic switch, a plunger within said solenoid, and means actuable by said plunger for braking one of said relatively movable elements.

6. In an integrator having an index lever, a time cycle lever, pawl means mounted on said time cycle lever for operating a cycle counter, and contacting means on said index lever for releasing said pawl means, means for stabilizing said index lever when said pawl means are contacted by said contacting means comprising a magnet on one of said levers, a magnetically operable electrical switch oppositely disposed on the other of said levers, a solenoid energizable by said switch, a plunger within said solenoid, and means actuated by said plunger for braking said index lever.

7. In an integrator comprising a shaft, a peripherally toothed wheel mounted thereon, a time cycle lever mounted on said shaft and having a footed pawl engageable with the teeth of said wheel, means for oscillating said time cycle lever, an index lever mounted on said shaft and having a trip pin the same distance from said shaft as the pawl foot, the improvement comprising:

(a) a brake cam mounted on said index lever;

(b) a magnetically operated switch mounted on said time cycle lever;

(c) a magnet mounted on said index lever for movement to a position opposite and adjacent to said magnetically operated switch;

(d) a mercury level switch mounted on said pawl such that when said pawl is engaged the switch is open, and when not engaged the switch is closed;

(e) a solenoid electrically energizable when said magnetically operated switch and said mercury level switch are closed; and (f) means activated by said solenoid for applying braking pressure to said brake cam.

References Cited in the file of this patent

UNITED STATES PATENTS

| | | |
|---|---|---|
| 2,308,687 | Harrison | Jan. 19, 1943 |
| 2,341,251 | Walther | Feb. 8, 1944 |
| 2,376,108 | Zucrow | May 15, 1945 |
| 2,386,108 | Gess et al. | Oct. 2, 1945 |
| 2,794,920 | Salmet | June 4, 1957 |